United States Patent [19]

Madonia et al.

[11] Patent Number: 4,486,478
[45] Date of Patent: Dec. 4, 1984

[54] MULTI LAYER LAMINATED TRIM SYSTEM

[76] Inventors: Ciro Madonia; Christopher Hatzikelis, both of c/o P.O. Box 39, Bolton, Ontario, Canada

[21] Appl. No.: 421,273

[22] Filed: Sep. 22, 1982

Related U.S. Application Data

[63] Continuation-in-part of Ser. No. 284,142, Jul. 16, 1981, abandoned, which is a continuation of Ser. No. 145,777, May 20, 1980, abandoned.

[51] Int. Cl.³ .................. B32B 25/08; B60K 13/00
[52] U.S. Cl. .................. 428/31; 428/516; 428/517; 428/518; 428/483
[58] Field of Search ............. 428/31, 516, 517, 518, 428/483; 156/327

[56] References Cited

U.S. PATENT DOCUMENTS

| | | | |
|---|---|---|---|
| 3,881,042 | 4/1975 | Ungerer | 428/31 |
| 4,046,945 | 9/1977 | Baxmann et al. | 428/518 |
| 4,139,664 | 2/1979 | Wenrick | 428/31 |

Primary Examiner—Paul J. Thibodeau

[57] ABSTRACT

The utilization of thermoplastic rubbers in the fabrication of body molding trim, such as automotive trim, is made possible in combination with polyvinyl chloride by the provision of an intermediate portion comprising a polyolefin having the property of providing nondelaminating adherence to the thermoplastic rubber and the polyvinyl chloride, thus permitting the use of thermoplastic rubber as the basis of a molding trim while making available the versatility and fabrication techniques already developed for polyvinyl chloride, including the use of decorative finishes such as mylar, bonded to the polyvinyl chloride.

5 Claims, 4 Drawing Figures

MULTI LAYER LAMINATED TRIM SYSTEM

CROSS REFERENCE TO RELATED APPLICATIONS

This is a continuation-in-part of application Ser. No. 284,142 filed July 16, 1981, now abandoned, itself a continuation of application Ser. No. 145,777 filed May 20, 1980, abandoned.

BACKGROUND OF THE INVENTION

This invention is directed to elongated decorative and protective molding as used in the automotive industry, generally referred to in the industry as trim.

Body molding trim receives wide use in the automotive industry, for purposes of decoration and protection.

Trim is generally derived from petro-chemical stock, primarily in the form of polyvinyl chloride (PVC). The use of thermoplastic rubbers (TPR's) provides a number of significant practical advantages over PVC, owing to the absence of plasticizers in the rubbers, the characteristic of substantial non-shrinkage possessed by the rubbers, and the lower density and smooth running characteristics possessed by the rubbers which greatly facilitates extrusion. However, TPR's do not laminate with polyvinyl chloride, nor do TPR's bond to polyethylene teraphthalate such as that trademarked mylar so that it has not been possible to utilize existing techniques for the fabrication and decoration of trim, as presently utilized with PVC.

A previous method of joining molded components and plastic films, shown in U.S. Pat. No. 4,046,945, Feb. 13, 1979 Baxman et al, involves the use of a fluid cement having a two component polyolefin of high viscosity mixed at a temperature in the range of 160° C. to 250° C., including various filler materials, and applied as hot mix by brush to the surfaces to be joined.

The two-element polymer of Baxman et al suffers from the disadvantages that it must be applied in a fluid form to one of the surfaces to be joined, at an elevated temperature, and at the time of the joint is to be effected, so that a pre-prepared joining element such as a vinyl tape having an adhesive polymer backing does not appear feasible using the materials of Baxman et al.

In a recently issued patent U.S. Pat. No. 4,139,664 Feb. 13, 1979 Wenrick, there is shown a form of trim construction having a composite section including an extruded portion in which mechanical joining is effected by way of projecting teeth, supplemented by an adhesive bond. A construction of this type suffers the production disadvantage of being totally unsuited to production by a continuous high speed process directly associated with the extrusion of the base section. Furthermore, the selection of materials is greatly restricted, due to the mechanical forming characteristics required of the toothed portion, and the construction is theoretically redundant in using complementary securing means to attach two sections together.

SUMMARY OF THE INVENTION

It has been found that the non-laminating relationship between TPR's and PVC can be overcome by the interposition of a polyolefin in bonded relation to facing surfaces of the TPR and the PVC. In particular it has been found that polypropylene provides satisfactory bonding characteristics, to substantially preclude undesired delamination.

The preferred embodiment of the invention comprises an extruded section of TPR of desired cross-sectional shape to which is bonded a PVC film to which is adhered a layer of polypropylene, the polypropylene being positioned in contacting relation with the TPR section. The PVC is usually in the form of a tape having a thin layer of polypropylene heat or pressure prebonded thereto.

The PVC film, usually a clear plastic, is suited for the application of decorative finishes thereto, such as coloured mylar films. The presence of such decorative finishes serves to conceal the physical appearance of the TPR, thereby deemphasizing the colour characteristics of the TPR and permitting the utilization of reworked TPR of varied, indeterminate or discoloured coloration.

The invention thus limits the required provision of coloration, to the mylar film or other decorative material bonded to the PVC layer.

The present invention thus provides a composite automotive trim section having a first extruded portion of thermoplastic rubber, a second portion substantially longitudinally co-extensive therewith, being of polyvinyl chloride film not generally adherable with the first portion, the first and second portions each having a surface area in facing relation with the other portion, an intermediate portion located between the facing area portions and a third material adherently compatible with the materials of the first and second portions constituting the sole securing agent between the first and second portions and comprising a single component polyolefin being itself thermally adherently compatible with the first and second portions and suited for prior application and storage with one of the portions to be joined, to provide substantially non-delaminating adhesion between the portions, the polyvinyl chloride film having a decorative finish layer in adherent protective relation therewith.

The third material to provide mutual adhesion is a polyolefin, namely polypropylene, being usually a weatherable type resistant to ultraviolet degradation.

BRIEF DESCRIPTION OF THE DRAWINGS

Certain embodiments of the invention are described, wherein.

DETAILED DESCRIPTION OF THE DRAWINGS

Figure 1:
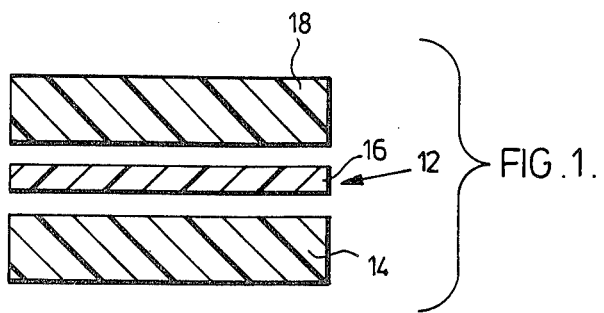
FIG. 1 is a schematic cross-section of a possible composite section incorporating joining elements of the present invention having the elements thereof in exploded relation.

The schematic part-section 12 of FIG. 1 has a base section 14 of TPR, an intermediate layer 16 of polyolefin and and upper layer 18 of PVC.

Figure 2:
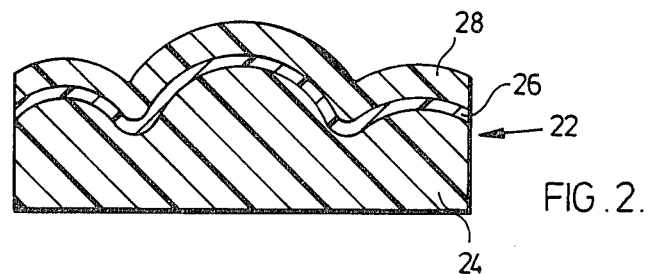
FIG. 2 is a portion of a section of a preferred embodiment showing a more typical form.

In the FIG. 2 embodiment, which more closely resembles a portion of a typical molding, the section 22 comprises a portion of a shaped, extruded base section 24 of TPR, an intermediate layer 26 of polypropylene adhering thereto, having an upper layer 28 of PVC adhering to the layer 26.

Figure 3:
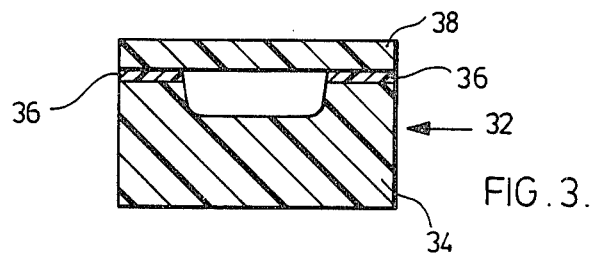
FIG. 3 is an alternative section that is contemplated.

In the FIG. 3 embodiment it is contemplated that the particular characteristics of the materials facilitates the provision of a hollow composite section 32 having a base section 34 of TPR, intermediate edge layers 36 of polypropylene, and an upper layer 38 of PVC. As before stated, the polypropylene will for most usages be of the weatherable type, capable of withstanding ultra-violet degradation by sunlight.

The form of trim shown in FIG. 2 is then suited for completion by the addition of mylar and other decorative finishes to the PVC, by established procedures, including the provision of additional protective finishes. In this regard, the relative shapes of the sections are not limited to the embodiments illustrated.

In the FIG. 2 embodiment, the portions 28 may comprise a PVC tape having a thickness such as 5 mil (0.005 inches) the polypropylene layer 26 possibly being a depostion of about 1 mil, to provide the desired adhesion, by pressurized thermal bonding to the base 24.

While polypropylene is specifically disclosed as having the desired bonding characteristic to both PVC and to TRP, it is anticipated that other polyolefins also possess satisfactory bonding characteristics to both classes of substance to provide utility.

Figure 4:
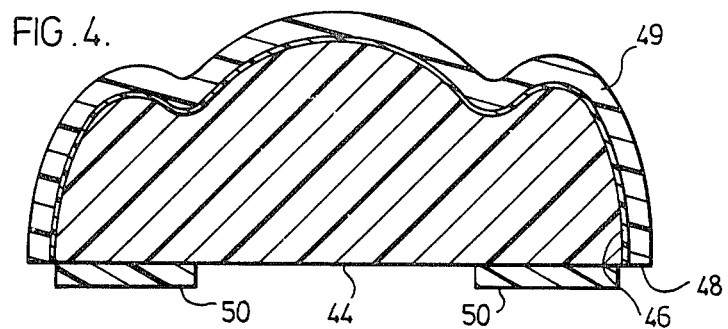
FIG. 4 is a schematic cross section of a completed automotive trim incorporating the composite section constructed in accordance with the present invention.

FIG. 4 is a more typical embodiment showing a completed trim, including the extruded TPR base section 44 having the PVC film 48 secured in overlying protective relation by way of the thin polypropylene layer 46, having a decorative and protective mylar tape coating 49 thereover, and contact adhesive strips 50 on the base of the section.

The PVC film 48 is usually pre-prepared, having the polypropylene layer 46 of about 1 mil thickness in adhering relating therewith, for ready application to the base section 44 at the time of extrusion of the TPR section.

What I claim by Letters Patent of the United States is:

1. A composite trim section having a first extruded portion of a thermoplastic rubber, a second portion substantially longitudinally co-extensive therewith being of polyvinyl chloride film not generally adherable with said first portion, said first and second portions each having a surface area in facing relation with the other portion, an intermediate portion located between said facing area portions of a third material bonded in heat sealed relation to said thermoplastic rubber constituting the sole securing agent between said first and second portions consisting of a single component polyolefin being in itself adherently compatible with said first and second portions, to provide substantially non-delaminating adhesion between said portions, said polyvinyl chloride film having a decorative finish layer in adherent protective relation therewith.

2. The trim section of claim 1, said decorative finish layer being a film of polyethylene teraphthalate.

3. The trim section of claim 1, wherein said polyolefin is polypropylene.

4. The trim section of claim 1, wherein said polyvinyl chloride film is a tape having said polyolefin secured in adhering relation to one face thereof.

5. The trim section of claim 4, wherein said polyolefin is bonded to said extruded portion of thermoplastic rubber simultaneously with the extrusion thereof.

* * * * *